United States Patent [19]

Devore et al.

[11] Patent Number: 5,239,047

[45] Date of Patent: * Aug. 24, 1993

[54] WET STRENGTH RESIN COMPOSITION AND METHOD OF MAKING SAME

[75] Inventors: David I. Devore, Langhorne; Stephen A. Fischer, Yardley, both of Pa.

[73] Assignee: Henkel Corporation, Amber, Pa.

[*] Notice: The portion of the term of this patent subsequent to Feb. 23, 2010 has been disclaimed.

[21] Appl. No.: 740,369

[22] Filed: Aug. 5, 1991

Related U.S. Application Data

[63] Continuation-in-part of Ser. No. 712,327, Jun. 7, 1991, which is a continuation-in-part of Ser. No. 652,346, Feb. 7, 1991, which is a continuation-in-part of Ser. No. 573,600, Aug. 24, 1990.

[51] Int. Cl.$^5$ .................... C08G 69/26; C08G 69/34
[52] U.S. Cl. .................. 528/339.3; 524/35; 524/414; 524/416; 524/417; 524/418; 524/420; 524/608; 524/800; 125/430; 428/411.1
[58] Field of Search ................. 524/35, 414, 416, 417, 524/418, 420, 608, 800; 525/430; 528/339.3; 428/411.1

[56] References Cited

U.S. PATENT DOCUMENTS

| | | | |
|---|---|---|---|
| 2,926,116 | 2/1960 | Keim | 162/164.3 |
| 3,049,469 | 8/1962 | Davison | 162/164.3 |
| 3,058,873 | 10/1962 | Keim et al. | 162/164.3 |
| 3,066,066 | 11/1962 | Keim et al. | 162/152 |
| 3,111,594 | 11/1963 | Stolte | 307/110 |
| 3,125,552 | 3/1964 | Loshaek et al. | 125/421 |
| 3,186,900 | 6/1965 | DeYoung | 162/164 |
| 3,197,427 | 7/1965 | Schmalz | 524/284 |
| 3,224,986 | 12/1965 | Butler et al. | 525/542.1 |
| 3,224,990 | 12/1965 | Babcock | 524/845 |
| 3,227,615 | 1/1966 | Korden | 167/87.1 |
| 3,227,671 | 1/1966 | Keim | 524/284 |
| 3,239,491 | 3/1966 | Tsou et al. | 162/164.3 |
| 3,240,761 | 3/1966 | Keim et al. | 162/164.3 |
| 3,248,280 | 4/1966 | Hyland | 162/164 |
| 3,250,664 | 5/1966 | Conte et al. | 162/164 |
| 3,324,280 | 6/1967 | Cheney et al. | 219/544 |
| 3,329,657 | 7/1967 | Strazdins et al. | 162/164.3 |
| 3,332,834 | 7/1967 | Reynolds | 162/164 |
| 3,332,901 | 7/1967 | Keim | 524/284 |
| 3,352,833 | 11/1967 | Earle | 162/164.3 |
| 3,442,754 | 5/1969 | Espy | 162/164 |
| 3,459,697 | 8/1969 | Goldberg et al. | 524/284 |
| 3,483,077 | 12/1969 | Aldrich | 162/158 |
| 3,609,126 | 9/1971 | Asno et al. | 525/430 |
| 4,714,736 | 12/1987 | Juhl et al. | 524/608 |
| 5,017,642 | 5/1991 | Hasegawa et al. | 524/608 |
| 5,019,606 | 5/1991 | Marten et al. | 524/608 |

FOREIGN PATENT DOCUMENTS

| | | |
|---|---|---|
| 335158 | 3/1989 | European Pat. Off. . |
| 332967 | 9/1989 | European Pat. Off. . |
| 335157 | 10/1989 | European Pat. Off. . |
| 1906561 | 2/1968 | Fed. Rep. of Germany . |
| 2938588 | 4/1981 | Fed. Rep. of Germany . |
| 3323732 | 1/1985 | Fed. Rep. of Germany . |
| 36237 | 5/1967 | Finland . |
| 1522583 | 10/1967 | France . |
| 7027833 | 12/1966 | Japan . |
| 7108875 | 2/1967 | Japan . |
| 7136485 | 3/1967 | Japan . |
| 7112083 | 11/1968 | Japan . |
| 7112088 | 11/1968 | Japan . |
| 6410230 | 3/1965 | Netherlands . |
| 6805823 | 9/1967 | South Africa . |
| 210023 | 12/1966 | Sweden . |
| 1073444 | 9/1963 | United Kingdom . |
| 1218394 | 3/1967 | United Kingdom . |

OTHER PUBLICATIONS

Wochenblatt fuer Papierfabrikation, vol. 2, pp. 63–67, 1989 (translation).

*Primary Examiner*—John Kight, III
*Assistant Examiner*—D. Truong
*Attorney, Agent, or Firm*—Ernest G. Szoke; Wayne C. Jaeschke; John E. Drach

[57] ABSTRACT

A wet strength resin composition is comprised of an aminopolyamide-epichlorohydrin acid salt resin having a total organically bound chlorine of up to 0.7% by weight of the resin. The amount of total organically bound chlorine present is controlled by the process parameters.

19 Claims, No Drawings

WET STRENGTH RESIN COMPOSITION AND METHOD OF MAKING SAME

CROSS-REFERENCE TO RELATED APPLICATIONS

This is a continuation-in-part application of application Ser. No. 07/712,327, filed on Jun. 7, 1991 which is a continuation-in-part of application Ser. No. 07/652,346, filed on Feb. 7, 1991 which is a continuation-in-part of application Ser. No. 07/573,600, filed on Aug. 24, 1990.

BACKGROUND OF THE INVENTION

1. Field of the Invention

This invention relates to wet strength resin compositions for paper and a method for making them.

2. Description of the Related Art

Aminopolyamide-epichlorohydrin resins were the first commercially significant neutral-to-alkaline curing wet strength resins for paper. In addition to the health and safety benefits that result from the resins being formaldehyde-free, their use also affords such benefits as reduced paper-machine corrosion and improved softness and absorbency in treated webs compared to urea-formaldehyde-treated webs. U.S. Pat. No. 2,926,116 teaches high wet strength paper is obtained by treating paper pulp with a water soluble polymeric reaction product of epichlorohydrin and a polyamide derived from a polyalkylenepolyamine and a dicarboxylic acid having from 3 to 10 carbon atoms. Other patents teaching the preparation and/or use of aminopolyamide-epichlorohydrin resins in wet strength applications for paper include U.S. Pat. Nos. 2,926,154; 3,049,469; 3,058,873; 3,066,066; 3,125,552; 3,186,900; 3,197,427; 3,224,986; 3,224,990; 3,227,615; 3,227,671; 3,239,491; 3,240,761; 3,248,280; 3,250,664; 3,311,594; 3,329,657; 3,332,834; 3,332,901; 3,352,833; 3,248,280; 3,442,754; 3,459,697; 3,483,077; 3,609,126; 4,714,736; British patents 1,073,444 and 1,218,394; Finnish patent 36,237 (CA 65: 50543d); French patent 1,522,583 (CA 71: 82835d); German patents 1,906,561 (CA 72: 45235h); 2,938,588 (CA 95: 9046t); 3,323,732 (CA 102: 151160c); Japanese patents 70 27,833 (CA 74: 4182m); 71 08,875 (CA 75: 49990k); 71 12,083 (CA 76: 115106a); 71 12,088 (CA 76: 115107b); 71 36,485 (CA 77: 90336f); Netherlands application 6,410,230 (CA 63: P5858h); South African patent 68 05,823 (CA 71: 114420h); Swedish patent 210,023 (CA 70: 20755y).

One of the drawbacks associated with the use of aminopolyamide-epichlorohydrin wet strength resins is the emission of harmful chlorinated compounds into the water systems of pulp and paper mills. These chlorinated compounds, which are the by-products of the manufacture of the aminopolyamide-epichlorohydrin resins, have been identified as epichlorohydrin, 1,3-dichloro-2-propanol, and 3-chloro-1,2-propanediol. These chlorinated organics are usually discharged into effluent waste water systems from pulp and paper mills because they are only partially substantive to cellulose pulp fibers. Since permissible amounts of halogenated organics in waste waters is ever decreasing, considerable effort has been expended to reduce the amount of these materials in aminopolyamide-epichlorohydrin wet strength resins. For example, European Patent Application 335,158 teaches that wet strength resins having organic chlorine values of about 0.001% are obtained by reaction of an aminopolyamide with a glycidyl sulfonate. European Patent Application 332,967 teaches that wet strength compositions containing 15% by weight of aminopolyamide-epichlorohydrin resins having organic chlorine contents of about 0.16% by weight of total composition or 1.1% by weight of aminopolyamide-epichlorohydrin acid salt resin are obtained by adding epichlorohydrin to an aqueous solution of aminopolyamide at 25° C.–30° C. and then heating the reaction mixture to 75° C. for a period of time sufficient to increase the viscosity of a 15% solids solution to 55 MPa-s at 25° C. The moles of epichlorohydrin/amine equivalents weight (E/N, infra) of the composition is equal to about 1.0. European Patent Application 332,967 teaches an elevated epichlorohydrin reaction temperature of 75° C. as compared to from about 15° C. to about 35° C. according to the invention. The application does not teach or suggest that very low total organically bound chlorine levels are obtainable by lowering the epichlorohydrin reaction temperature while maintaining the E/N ratio in the range of from 0.6 to 1.08. European Patent Application 335,157 teaches an epichlorohydrin reaction temperature of 55° C. as compared to from about 15° C. to about 35° C. according to the invention and an E/N ratio of about 1.2 as compared to maintaining the E/N ratio in the range of from 0.6 to 1.08 according to the invention. The composition produced by the disclosed process contains about 3.12% total organic chlorine based upon the weight of the aminopolyamide-epichlorohydrin acid salt resin. The application does not teach or suggest that very low total organic chlorine levels are obtainable by lowering the epichlorohydrin reaction temperature and lowering the E/N ratio. Wochenblatt für Papierfabrikation 2, 63–67 (1989) teaches that a modified aminopolyamide-epichlorohydrin resin has an absorbable organic halogens content 70% lower than conventional commercial products. The wet strength resin compositions according to the invention contain organic chlorine compounds in amounts which are at least 99% lower than commercial aminopolyamide-epichlorohydrin resins. Wochenblatt für Papierfabrikation 2, 63–67 (1989) neither identifies the modified aminopolyamide-epichlorohydrin resin nor teaches how to make it. U.S. Pat. No. 3,887,510 teaches an improvement in the process for the preparation of an aqueous solution of cationic thermosetting resin. The process being improved comprises forming a long-chain water-soluble polyamide from a diester of a C3 to C6 saturated aliphatic dicarboxylic acid with a C1 to C3 saturated aliphatic alcohol and a polyalkylene polyamine having two primary amine groups and at least one secondary amine group the mol ratio of the polyamine to the diester being from about 0.8/1 to 1.4/1, and then reacting the polyamide in aqueous solution with epichlorohydrin in amount such that the mol ratio of epichlorohydrin to the sum of secondary and tertiary amine groups in the polyamide is from about 0.5/1 to about 1.8/1. The improvement comprises forming the polyamide by reacting the polyalkylene polyamine under substantially anhydrous conditions at from about 80° to about 95° C., from about 1.5 to 3 hours, at atmospheric pressure with the diester and removing the alcohol formed at a temperature no higher than about 105° C. to produce a polyamide having an intrinsic viscosity of from about 0.08 to 0.12 dl/gram in 1 n aqueous ammonium chloride at 25° C. The patent also teaches that removing the alcohol at a temperature of about 120° C. at 140° C. is effective in obtaining products with certain superior combinations of properties and that some benefits can be obtained when the temperature is as high as about 170° C. However, the patent does not teach which properties are affected by the maintaining the temperatures in the stated ranges. U.S. Pat. No. 5,017,642 teaches a process for producing a cationic thermosetting resin containing a very small amount of organic halogen compounds which comprises (i) heating an aliphatic dicarboxylic acid and a polyalkylenepolyamine in a molar ratio of the aliphatic dicarboxylic acid to the polyalkylenepolyamine of 1:1.0 to 1:1.2 until the viscosity at 25° C. of a 50% aqueous solution of resulting polyamidopolyamine reaches 400 to 1000 cps to obtain a polyamidopolyamine; (ii) reacting the polyamidopolyamine with epihalohydrin in an aqueous medium at a temperature from 10° to 55° C. under such conditions that the amount of epihalohydrin is from 0.85 to 1.40 moles per mole of secondary amino group present in the polyamidopolyamine when the reaction temperature is not lower than 10° C. and lower than 45° C. or from 0.85 to 1.25 moles per mole of said secondary amino group when the reaction temperature is from 45° to 55° C., a total concentration of reactants in the aqueous medium is 20 to 70% by weight until a total amount of unreacted epichlorohydrin and other organic halogen compound does not change substantially; (iii) maintaining or lowering the concentration of the resulting aqueous solution of the reaction product; (iv) keeping the temperature of the aqueous solution from 25° to 70° C. until the viscosity at 25° C. of the aqueous solution at a concentration of 15% reaches 10 to 100 cps; (v) adjusting pH of the resulting aqueous solution of the product to 3 to 5 at 25° C. U.S. Pat. No. 5,019,606 teaches that a polyamidoamine-epichlorohydrin wet strength resin wherein the amount of organically bound chlorine in the resin is no more than 4% by weight of the resin is made by a process which comprises reacting a water soluble polyamidoamine with epichlorohydrin in a mole ratio of polyamidoamine to epichlorohydrin of 0.6 to 2.0 and then reacting with a sufficient amount of base at 25° C.–95° C. so that the pH is greater than 8 and subsequently adjusting the pH to not more than 7 by the addition of acid.

The related art does not teach wet strength resins compositions comprised of an aminopolyamide-epichlorohydrin acid salt resin and up to 0.7% by weight total organically bound chlorine based on the weight of said resin. The related art also does not teach a relationship between the temperature at which alcohol is removed in the aminopolyamide resin-making process and the wet strengthening ability of the aminopolyamide-epichlorohydrin resin made from the aminopolyamide resin. The related art also does not teach a relationship between the epichlorohydrin-aminopolyamide reaction time and very low total organically bound chlorine content in processes to make wet strength resins compositions comprised of an aminopolyamide-epichlorohydrin acid salt resins.

SUMMARY OF THE INVENTION

The present invention provides a wet strength resin composition comprising from about 1% to about 60% by weight of an aminopolyamide-epichlorohydrin acid salt resin, up to 0.7% by weight total organically bound chlorine based on the weight of said resin, and the remainder water.

The wet strength resin compositions according to the invention can be made by a process whose first step is the aminolysis of an ester. A $C_{1-3}$ dialkyl ester of a saturated aliphatic dicarboxylic acid having from 3 to 6 carbon atoms is heated with a polyalkylenepolyamine having two primary amine groups and at least one secondary amine group in the absence of water. The ester to polyalkylenepolyamine molar ratio has a value of up to 1:1. During the heating step, the reaction temperature first reaches a maximum of about 150° C.–160° C. at which point the alcohol formed as a result of the reaction between the diester and the polyalkylenepolyamine begins to boil. The alcohol is retained in the reaction by refluxing it which also lowers the reaction temperature. After the temperature drops to about 110° C.–115° C., the alcohol is removed from the reaction at a temperature of from about 110° C. to about 160° C. The alcohol removal is continued until the viscosity of a 50% aqueous solution of resulting polyamidopolyamine at 25° C. reaches at least 700 cps. At this point, epichlorohydrin is added to an aqueous solution of the polyalkylenepolyamine at such a rate that the reaction temperature is maintained in the range of from about 5° C. to about 30° C. After all the epichlorohydrin has been added, the resulting reaction mixture has an E/N ratio of from 0.6 to 1.08. Then the temperature of the reaction mixture is maintained in a range of from about 15° C. to about 35° C. until all of the epichlorohydrin has reacted as indicated by analysis of the reaction mixture. The pH of the reaction mixture is then adjusted to a value of up to about 7.0. The process produces a wet strength resin composition comprised of an aqueous solution of an aminopolyamide-epichlorohydrin acid salt resin which has a total organically bound chlorine of up to 0.7% by weight of said resin.

A cellulosic fibrous web treated with a wet strengthening effective amount of the wet strength resin composition according to the invention has a wet tensile higher than a corresponding untreated web.

DESCRIPTION OF THE PREFERRED EMBODIMENTS

Polyalkylenepolyamines which can be used according to the invention are those which have two primary amine groups and at least one secondary amine group such as diethylenetriamine, triethylenetetramine, tetraethylenepentamine, and bis-hexamethylenetriamine and the like. The dicarboxylic acid esters which can be used in the process according to the invention are those which are $C_{1-3}$ diesters of $C_{3-6}$ dicarboxylic acids. Such diesters can be made for example, by direct esterification of a dicarboxylic acid having from 3 to 6 carbon atoms with an alcohol having from 1 to 3 carbon atoms. Examples of such esters include but are not limited to dimethyl malonate, dimethyl succinate, dimethyl adipate, and dimethyl glutarate. Mixtures of any or all of such esters can also be used in the process according to the invention. Preferably, the esters are mixtures of dimethyl adipate and dimethyl glutarate which are sold as DBE-2 ™, a product of the DuPont Corporation.

The molar ratio of ester to polyalkylenepolyamine in the aminolysis step should not exceed 1:1. Values greater than 1:1 will result in gelation of the reaction product. Preferably, the ester- polyalkylenepolyamine reaction mixture is heated at atmospheric pressure in a reaction vessel equipped with a reflux condenser until the temperature first reaches a value of about 150° C.–160° C. during which time the alcohol formed in the reaction begins to reflux. The refluxing alcohol removes heat from the reaction mixture and the temperature continuously falls as more and more alcohol is produced. When the reaction temperature drops to about 110° C., the alcohol is removed at a temperature in the range of from about 110° C. to about 160° C. The alcohol removal can be accomplished by changing the condenser configuration from reflux to take-off. Alcohol is continuously removed until the viscosity of a 50% aqueous solution of resulting polyamidopolyamine at 25° C. reaches at least 700 cps. and preferably 1000 cps. If the alcohol removal is accomplished at a temperature lower than 110° C., the viscosity of a 50% aqueous solution of the polyamidopolyamine at 25° C. will not reach at least 700 cps and the resulting wet strength resin will not increase the wet tensile of a treated sheet to an acceptable level. Table II shows the effect of the viscosity of a 50% aqueous solution of the polyamidopolyamine (PAA) resin on the wet tensile development of a treated sheet. The higher the viscosity of a 50% aqueous PAA solution the higher the wet tensile ratio and the more closely the particular low TOCl resin behaves like a commercial resin which is at least one order of magnitude higher in TOCl. Since it has been found that product gelation results if the molar ratio of ester to polyalkylenepolyamine exceeds 1:1, it is important to insure that substantially all of polyalkylenepolyamine reacts before the alcohol formed in the reaction is removed. Premature alcohol removal can result in the simultaneous removal of some of the polyalkylenepolyamine thereby altering the ester/polyalkylenepolyamine molar ratio sufficient to result in product gelation. Retention of the alcohol in the reaction mixture for example by refluxing, insures that no polyalkylenepolyamine is lost before it reacts with the ester.

The polyamidopolyamine formed in the aminolysis reaction is then reacted with epichlorohydrin in aqueous solution to form an aminopolyamide-epichlorohydrin resin. The concentration of the aminopolyamide in the water is not critical as long as the combined reaction solids content of aminopolyamide and epichlorohydrin present after step (c) are in the range of from about 5% to about 60% by weight. The preferred % aminopolyamide solids in step (b) of the process is from about 29% to about 39% by weight. The relative amounts of aminopolyamide-epichlorohydrin resin are expressed as the E/N ratio. The E/N ratio is defined by Equation I as $$\frac{\text{moles epichlorohydrin}}{\text{amine equivalents}} \qquad \text{Eq. I}$$

where the amine equivalents is defined by Equation II as $$\frac{\text{wt. of aminopolyamide sol'n} \times \% \text{ solids as decimal} \times TA}{56110} \qquad \text{Eq. II}$$

and TA, which is total alkalinity, is defined by Equation III as $$\frac{\text{volume (ml)} \times \text{normality of stnd. acid} \times 56.11}{\text{wt. of aminopolyamide sol'n} \times \% \text{ solids as decimal}} \qquad \text{Eq. III}$$

The total alkalinity of a typical aminopolyamide is in the range of from about 270 to about 380 mg/g of KOH on a solids basis. The amount of epichlorohydrin to be added in step (c) of the process is calculated by substituting the numerical value for the amine equivalents as calculated by Equation II into Equation I, setting the E/N value equal to about 0.9, and solving the equation for moles of epichlorohydrin. The epichlorohydrin is added to the aminopolyamide solution neat at a rate sufficient to maintain the temperature of the reaction mixture in the range of from about 5° C. to about 30° C., preferably from about 10° C. to about 15° C. In step (d) the temperature of the reaction mixture is then maintained in a range of from about 15° C. to about 35° C. until all of the epichlorohydrin has reacted. The epichlorohydrin reaction time referred to in Table I is the time required for step (d) and can be determined by analysis of the reaction mixture for total organically bound chlorine as described in Example 19. All of the epichlorohydrin has reacted when the total organically bound chlorine is less than about 7000 ppm (0.7% by weight) based on reaction solids. The epichlorohydrin reaction time can also be determined from viscosity measurements of the reaction mixture by means of a Brookfield viscometer using a #2 spindle at 30 r.p.m. at 25° C. When step (d) of the process is carried out at a preferred total solids content of about 45%, the epichlorohydrin reaction temperature is maintained until the Brookfield viscosity of the reaction mixture falls within the range of from about 500 to about 1500 cps. In another preferred embodiment, when the total solids content of step (d) is 40%, the epichlorohydrin reaction temperature is maintained until the Brookfield viscosity of the reaction mixture falls within the range of from about 350 to about 800 cps. In yet another preferred embodiment, when the total solids content of step (d) is 35%, the epichlorohydrin reaction temperature is maintained until the Brookfield viscosity of the reaction mixture falls within the range of from about 200 to about 500 cps. The product formed in step (d) is an epichlorohydrinaminopolyamide resin. After the temperature has been held in the range disclosed above, the reaction is stopped by adjusting the pH of the reaction mixture to a value of less than about 7. The addition of an amount of water to reach a desired final % solids level followed by pH adjustment can also stop the reaction. The preferred final solids content is from about 35% to about 45% by weight of solution. The pH of the reaction mixture is always adjusted by acidification regardless of whether water is or is not added to stop the reaction. The acidification can be accomplished by any means known to those of ordinary skill in the art. For example, a gaseous acid such as anhydrous hydrogen chloride can be introduced into the aqueous reaction mixture or an aqueous acid solution can be added. Preferably an aqueous acid solution is used to adjust the pH to a value of less than about 7.0 such as hydrochloric acid, sulfuric acid, phosphoric acid, acetic acid, propionic acid, or benzoic acid. The preferred aqueous acid solution is hydrochloric acid. While any pH value of less than about 7.0 can be achieved, the preferred value is in the range of from about 2 to about 4. The process according to the invention produces a wet strength resin composition comprising an aminopolyamide-epichlorohydrin acid salt resin and a total organically bound chlorine of less than 0.7% by weight of the aminopolyamide-epichlorohydrin acid salt resin. The total organically bound chlorine is determined by the method described in Example 19.

The process according to the invention produces unexpectedly low levels of total organically bound chlorine in a wet strength resin which performs at least as well as resins which have one to two orders of magnitude more total organically bound chlorine because during the synthesis of the aminopolyamide the aminolysis of the esters is carried out until the viscosity of a 50% aqueous solution of resulting polyamidopolyamine at 25° C. reaches at least 700 cps and the epichlorohydrin reaction is carried out at relatively low temperatures and at the relatively low E/N ratio from 0.6 to 1.08. A resin prepared by the process according to the invention but having an E/N ratio of greater than 1.08 will have an unacceptably high TOCl content. An unacceptably high TOCl content is one which is greater than 0.7% by weight of the aminopolyamide-epichlorohydrin acid salt resin. Examples 2-11 are resins prepared by the process according to the invention which produces the combined effects of low total organically bound chlorine and wet tensile development equal to resins containing up to about 2 orders of magnitude more total organically bound chlorine. Examples 12-17 are resins prepared by the methods according to the prior art and show the effects of elevated epichlorohydrin reaction temperatures at equal or greater E/N ratios for resins prepared according to the process of the invention. Conventional wisdom dictates that optimum wet strength performance and minimum total organically bound chlorine levels are favored by optimizing the epichlorohydrin reaction which is in turn favored by reaction temperatures greater than room temperature and E/N ratios of from 0.6 to 1.08.

The present invention also provides cellulosic fibrous webs comprising a wet strengthening effective amount of an aminopolyamide-epichlorohydrin acid salt resin and less than 0.7% of total organically bound chlorine by weight of said aminopolyamide-epichlorohydrin acid salt resin. A wet strengthening effective amount of an aminopolyamide-epichlorohydrin acid salt resin is any amount required to reach a desired wet strength as determined by wet tensile measurements. Different applications will require different amounts of wet tensile and hence different amounts of wet strength resin composition containing an aminopolyamide-epichlorohydrin acid salt resin. The relationship between the amount of wet strength resin composition added to a cellulosic fibrous web and the wet tensile produced therefrom is dependent upon a number of factors such as the nature of the pulp fibers and the method of application and is readily determinable by one of ordinary skill in the art. The wet strength resin compositions according to the invention are normally applied to cellulosic pulp fibers at dosage level of from about 1 to about 30 pounds of dry wet strength resin per ton of fiber to produce wet strengthened webs. The wet strength resin compositions according to the invention can be applied to cellulosic pulp fibers by any method known to those of ordinary skill in the art such as by spraying, dipping or coating a pre-formed sheet or in the wet end of a paper machine since the aminopolyamide-epichlorohydrin acid salt resins in the wet strength resin compositions are substantive to cellulose pulp fibers. The preferred amount of dry wet strength resin per ton of fiber is in the range of from about 4 to about 12 lbs pounds per ton. The following examples will serve to illustrate but not limit the invention.

EXAMPLE 1

Preparation of an Aminopolyamide Resin

To a resin reactor was charged one mole of a dibasic acid ester mixture comprised of 65% dimethyl glutarate and 35% dimethyl adipate and one mole of diethylene triamine. Stirring and nitrogen sparge were started and the contents of the reactor were heated to 150° C.-160° C. Methanol began to reflux at about 157° C. The reflux was allowed to continue until the reaction temperature reached 125° C. at which time the methanol was distilled off. The reaction temperature was maintained in the 140° C.-160° C. range during the approx. 3 hours required for distillation of about 85% of the theoretical amount of methanol. The Brookfield viscosity (spindle #3@12 rpm) of a 48.4% aqueous solution of the resin thus obtained was 2850 cps. A 33.5% solids resin solution had a total alkalinity of 376 mg KOH/g on a solids basis and a Brookfield viscosity (spindle #2@60 rpm) of 280 cps.

EXAMPLES 2-17

Examples 2-11 describe the preparation of wet strength resin compositions according to the invention and prepared according to the process of according to the invention. Examples 12-17 describe the preparation of resin compositions using reaction parameters outside the scope of the process according to the invention. The entries in Table I list the various reaction parameters, wet strength performance, and total organically bound chlorine of compositions corresponding to examples 2-17. Examples 3-11 were prepared exactly like the procedure of Example 2. Comparisons of resins in Examples 2-11 to those in Examples 12-17 should be made only for those resins having the same E/N values. For example, the properties of the resin of Example 5 should be compared with those of Example 13 because both resins have an E/N ratio equal to 0.7.

EXAMPLE 2

Preparation of Wet Strength Resins Compositions

To a round bottom flask were charged 171 grams of a 48.0% solids aminopolyamide resin solution having a total alkalinity based on solids content (TA) of 274.8 mg KOH/g and 38 grams of water. Gentle stirring was applied and the contents of the flask were cooled to about 15° C. (ECH addition temperature) at which time about 26 grams of epichlorohydrin were added over 3 hours. After completion of the epichlorohydrin addition, the contents of the reactor were allowed to exotherm to a temperature of about 20° C. The reaction mass was held at this temperature for 12.5 hours (ECH reaction temperature & time). The viscosity at this point (Final Visc.) was 602 cps. The reaction was stopped by adjusting the pH of the solution to 2.0 with 37% hydrochloric acid. The resin solution contained 45.6% solids and 0.044% total organic chlorides based on the resin solids (% total Cl) as determined by extraction-G.C. method. (Example 19)

EXAMPLE 18

Performance Testing of Wet strength Resin Compositions

1. Stock Preparation

Kraft softwood lapboard (Bowater) was beaten in a large capacity Waring Blender at 4.1% consistency for 10 minutes at 15,500 r.p.m. and then further diluted to 0.27% consistency. The drainage of the diluted stock was measured at 110–120 ml by "30 Second Britt Drainage" method using a 4" circular 70 mesh screen with the Mark IV Dynamic Handsheet Mold/Paper Chemistry Jar Assembly.

2. Handsheet Preparation

Blank handsheets were prepared according to the handsheet preparation method outlined in the Mark IV Dynamic Handsheet Mold/Paper Chemistry Jar Assembly operating manual. Treated handsheets were prepared by the same method except a dosage of 8 dry pounds wet strength resin per ton of dry pulp was manually added to the dispersed stock slurry and the furnish was mixed at 750 r.p.m. for 55 seconds. Handsheets were blotted dry between felt sheets and pressed with a rolling pin in back and forth and diagonal directions. Pressed sheets were placed between drying rings and conditioned overnight at 50% humidity and 70° C. as per instructions in the Mark IV Dynamic Handsheet Mold/Paper Chemistry Jar Assembly operating manual. The dosage level for all sheets used to generate the data given in Tables I and II was 8 lbs resin/ton pulp.

3. Wet Tensile Determination

Tensile strips measuring 1" by 4" were cut from treated handsheets and soaked for 1 hour in water at 25° C. Tensile strengths were determined on an Instron Tensile Tester using a 10 lb load cell. The wet tensile ratio, R, of Tables I and II is defined as the ratio of the wet tensile of a sheet treated with a wet strength resin composition according to the invention to the ratio of the wet tensile of commercial product B which is Fibrabond 33 ™, a product of Henkel Corporation, Ambler, Pa. Product A in Table I is Kymene 557H ™, a product of Hercules, Wilmington, Del.

TABLE II

Effect of PAA Base Viscosity on PAE Resin Performance

| | PAA BASE | | | | PAE RESIN | | |
|---|---|---|---|---|---|---|---|
| I.D | TA[1] | % Solids | pH | Visc.[2] | E/N | WET[3] | % W/D[4] | R[5] |
| 1 | 290 | 50 | 9.8 | 375 | 1.0 | 1.7 | 14 | 0.77 |
| 2 | 277 | 50 | 9.7 | 765 | 1.0 | 1.9 | 15 | 0.86 |
| 3 | 280 | 50 | 10 | 925 | 1.0 | 2.1 | 17 | 0.97 |

[1]Total alkalinity based on solids
[2]Brookfield (Spindle #2, @ 12 RPM) viscosity of a 50% aqueous solution in cps
[3]Wet tensile of sheet treated with PAE resin
[4]Wet tensile/dry tensile × 100%
[5]Wet tensile ratio defined in Example 18.

EXAMPLE 19

Total Organically Bound Chlorine Analysis

Extraction-G.C. Method

1. Sample Preparation

Approximately 5,000 g of the wet strength resin composition according to the invention comprised of an aminopolyamide-epichlorohydrin acid salt resin was added into a 40 ml screw-top centrifuge tube. About 25 ml of ethyl acetate was added and the contents of the centrifuge tube were shaken thoroughly until the resin solution was dispersed. The contents of the tube were allowed to stand for 5 min. and then shaken again. The contents of the tube were centrifuged at high speed for 10 min. or until the upper solvent layer was clear. A portion of the supernatant solution was taken for G.C. injection.

2. Preparation of Standards

Stock solutions of approximately 1000 rmp of epichlorohydrin, 1,3-dichloro-2-propanol, and 3-chloro-1,2-propanediol were prepared in ethyl acetate on a weight to weight basis. These were further diluted volumetrically to lower levels prior to use. The second dilution depended upon the anticipated concentrations of the level of organic chlorides in the aminopolyamide-epichlorohydrin resin solutions.

TABLE I

| Resin | E/N | % Rx Slds | ECH Addition T[1] | °C.[2] | ECH Reaction T[3] | °C.[4] | Vis[5] | R[6] | % Cl |
|---|---|---|---|---|---|---|---|---|---|
| Ex. 2 | 0.7 | 45 | 3.0 | 15 | 12.5 | 20 | 602 | 0.9 | 0.04 |
| Ex. 3 | 0.7 | 40 | 3.0 | 15 | 18.25 | 15 | 347 | 1.1 | 0.04 |
| Ex. 4 | 0.7 | 40 | 1.0 | 10 | 14.0 | 20 | 375 | 0.9 | 0.05 |
| Ex. 5 | 0.7 | 35 | 3.0 | 15 | 14.5 | 20 | 198 | 1.0 | 0.05 |
| Ex. 6 | 0.7 | 45 | 3.0 | 10 | 11.75 | 20 | 640 | 0.9 | 0.03 |
| Ex. 7 | 0.7 | 45 | 3.0 | 10 | 10.0 | 22.5 | 670 | 0.9 | 0.03 |
| Ex. 8 | 0.7 | 45 | 1.0 | 10 | 7.5 | 25 | 660 | 1.0 | 0.04 |
| Ex. 9 | 1.0 | 45 | 1.0 | 10 | 30 | 20–25 | 650 | 1.3 | 0.32 |
| Ex. 10 | 1.0 | 45 | 0.78 | 10 | 12 | 30 | 1150 | 0.9 | 0.56 |
| Ex. 11 | 1.05 | 45 | 3.0 | 25 | 21.25 | 25–28 | 900 | 0.9 | 0.48 |
| Ex. 12 | 1.5 | 46 | 0.61 | 10 | 8.0 | 50 | 2250 | 0.9 | 9.8 |
| Ex. 13 | 0.7 | 35 | 0.5 | 10 | 4.0 | 30 | 210 | 1.0 | 0.24 |
| Ex. 14 | 0.5 | 35 | 0.5 | 10 | 2.75 | 30 | 200 | 0.8 | 0.14 |
| Ex. 15 | 0.6 | 35 | 0.5 | 10 | 3.5 | 30 | 218 | 0.9 | 0.14 |
| Ex. 16 | 1.0 | 35 | 0.5 | 10 | 8.25 | 30 | 202 | 1.1 | 1.01 |
| Ex. 17 | 1.1 | 45 | 0.1 | 15 | 15 | 25–30 | 635 | — | 0.96 |
| Resin A | | | | | | | | 0.9 | 13.8 |
| Resin B | | | | | | | | 1.0 | 9.7 |

[1]Epichlorohydrin addition time in hours.
[2]Temperature maintained during epichlorohydrin addition.
[3]Epichlorohydrin reaction time in hours.
[4]Temperature maintained during epichlorohydrin reaction.
[5]Final viscosity in centapoise.
[6]Wet tensile ratio as defined in Example 18.

3. Gas Chromatographic Conditions

Detector: electron capture
Column:
  0.54 mm capillary column, polyethylene glycol stationary phase, 2.5 micron film thickness.
Septum purge: 0.5 minute
Carrier gas: He, 10 psi head pressure
Makeup gas: Nitrogen at 40 psi Because of the differences between the retention times of epichlorohydrin and chloropropanediol, optimum integration of all peaks was achieved when the analysis was done in two steps. The best values for 1,3-dichloro-2-propanol, and 3-chloro-1,2-propanediol resulted from an isothermal run at 190° C. and for epichlorohydrin, a ramped program from 120° C.-190° C. was used.

4. Calculations

The concentration of organically bound chlorine in the extract was calculated from the formula:

$$\text{Conc. of Extract} = \frac{\text{Conc. of Stnd.}}{\text{Response of Stnd.}} \times \text{Response of Extract}$$

The resulting concentration in the extract was multiplied by the ratio of ethyl acetate to aminopolyamide-epichlorohydrin samples used in the extraction to give the concentration of organically bound chlorine in the original sample.

What is claimed is:

1. A wet strength resin composition comprising from about 1% to about 60% by weight of an aminopolyamide-epichlorohydrin acid salt resin, up to 0.7% by weight total organically bound chlorine based on the weight of said resin, and the remainder water.

2. The wet strength resin composition of claim 1 wherein the amount of said aminopolyamide-epichlorohydrin acid salt resin in said composition is about 10% by weight.

3. The wet strength resin composition of claim 1 wherein the amount of said aminopolyamide-epichlorohydrin acid salt resin in said composition is about 35% by weight.

4. The wet strength resin composition of claim 1 wherein the amount of said aminopolyamide-epichlorohydrin acid salt resin in said composition is about 45%.

5. A process for producing a wet strength resin composition comprising the steps of: (a) heating a $C_{1-3}$ dialkyl ester of a saturated aliphatic dicarboxylic acid having from 3 to 6 carbon atoms and a polyalkylenepolyamine having two primary amine groups and at least one secondary amine group in a molar ratio of said ester to said polyalkylenepolyamine of up to 1:1 to a temperature of from about 150° C. to about 160° C. and continuing said heating until the reaction temperature drops to from about 110° C. to about 120° C.; (b) removing the alcohol formed in said reaction mixture at a temperature of from about 110° C. to about 160° C. until the viscosity at 25° C. of a 50% aqueous solution of resulting polyamidopolyamine reaches at least 700 cps; (c) adding epichlorohydrin to an aqueous solution of said polyamidopolyamine at a rate sufficient to maintain the temperature in a range of from about 5° C. to about 30° C. to form a reaction mixture having an E/N ratio of from 0.6 to 1.08; (d) maintaining the temperature of said reaction mixture in a range of from about 15° C. to about 35° C. until all of the epichlorohydrin has reacted; and (e) adjusting the pH of said reaction mixture to a value of up to about 7.0 to produce a wet strength resin composition comprised of an aqueous solution of an aminopolyamide-epichlorohydrin acid salt resin wherein said composition has total organically bound chlorine of up to 0.7% by weight of said resin.

6. The process of claim 5 wherein the amount of aminopolyamide resin in said aqueous solution is from about 10% to about 45% by weight.

7. The process of claim 6 wherein the amount of aminopolyamide resin in said aqueous solution is from about 35% to about 45% by weight.

8. The process of claim 6 wherein the amount of aminopolyamide resin in said aqueous solution in step (c) is about 45% by weight.

9. The process of claim 5 wherein said temperature range in step (c) is from about 10° C. to about 35° C.

10. The process of claim 9 wherein said temperature range is from about 20° C. to about 30° C.

11. The process of claim 5 wherein said pH is adjusted with an aqueous acid solution.

12. The process of claim wherein said aqueous acid solution is hydrochloric acid.

13. The process of claim 5 wherein said pH is from about 2.0 to about 4.0.

14. The process of claim 5 wherein the temperature in step (d) is maintained in a range of from about 15° C. to about 35° C. until the viscosity of said reaction mixture is equal to from about 500 to about 1500 cps when the solids content of said reaction mixture is equal to about 45% by weight.

15. The process of claim 5 wherein the temperature in step (d) is maintained in a range of from about 15° C. to about 35° C. until the viscosity of said reaction mixture is equal to from about 350 to about 800 cps when the solids content of said reaction mixture is equal to about 40% by weight.

16. The process of claim 5 wherein the temperature in step (d) is maintained in a range of from about 15° C. to about 35° C. until the viscosity of said reaction mixture is equal to from about 200 to about 400 cps when the solids content of said reaction mixture is equal to about 35% by weight.

17. A cellulosic fibrous web comprising a wet strengthening effective amount of an aminopolyamide-epichlorohydrin acid salt resin and up to 0.7% of total organically bound chlorine by weight of said aminopolyamide-epichlorohydrin acid salt resin.

18. The cellulosic fibrous web of claim 17 wherein said aminopolyamide-epichlorohydrin acid salt resin is present in an amount equal to from about 1 to about 30 lbs pounds per ton of the fiber in said web.

19. The cellulosic fibrous web of claim 18 wherein said aminopolyamide-epichlorohydrin acid salt resin is present in an amount equal to from about 4 to about 12 lbs pounds per ton of the fiber in said web.

* * * * *

UNITED STATES PATENT AND TRADEMARK OFFICE
CERTIFICATE OF CORRECTION

PATENT NO. : 5,239,047
DATED : August 24, 1993
INVENTOR(S) : Devore et al.

It is certified that error appears in the above-indentified patent and that said Letters Patent is hereby corrected as shown below:

In claim 12, column 12, line 27, "the process of claim" should read -- the process of claim 11--.

Signed and Sealed this

Twenty-second Day of March, 1994

Attest:

BRUCE LEHMAN

*Attesting Officer*  *Commissioner of Patents and Trademarks*